(12) United States Patent
Kostar et al.

(10) Patent No.: US 7,247,212 B2
(45) Date of Patent: Jul. 24, 2007

(54) ORTHOGONAL WEAVING FOR COMPLEX SHAPE PREFORMS

(75) Inventors: Timothy Daniel Kostar, Nashua, NH (US); Douglas Melton Carper, Trenton, OH (US); Suresh Subramanian, Mason, OH (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 11/018,221

(22) Filed: Dec. 21, 2004

(65) Prior Publication Data

US 2006/0130957 A1 Jun. 22, 2006

(51) Int. Cl.
- *C04B 35/80* (2006.01)
- *D03D 23/00* (2006.01)
- *D03D 1/00* (2006.01)
- *F02C 7/00* (2006.01)
- *F01D 5/28* (2006.01)

(52) U.S. Cl. .............................. 156/89.11; 156/89.23; 156/89.26; 156/148; 28/149; 28/152; 139/1

(58) Field of Classification Search ............ 156/89.11, 156/89.26, 89.28, 148; 28/149, 152; 139/1
See application file for complete search history.

(56) References Cited

U.S. PATENT DOCUMENTS

| | | | |
|---|---|---|---|
| 3,943,980 A | 3/1976 | Rheaume | |
| 3,965,942 A | 6/1976 | Hatch | |
| 4,412,854 A | 11/1983 | Layden | |
| 4,414,049 A * | 11/1983 | Jones | 156/166 |
| 4,613,473 A * | 9/1986 | Layden et al. | 264/103 |
| 4,615,256 A | 10/1986 | Fukuta et al. | |
| 4,725,485 A | 2/1988 | Hirokawa | |
| 4,906,506 A | 3/1990 | Nishimura et al. | |
| 4,922,968 A | 5/1990 | Bottger et al. | |
| 5,026,595 A | 6/1991 | Crawford, Jr. et al. | |
| 5,064,705 A | 11/1991 | Donovan, Sr. | |
| 5,100,713 A | 3/1992 | Homma et al. | |
| 5,270,094 A * | 12/1993 | Anahara et al. | 428/113 |
| 5,327,621 A * | 7/1994 | Yasui et al. | 28/149 |
| 5,346,774 A | 9/1994 | Burgess | |
| 5,348,056 A | 9/1994 | Tsuzuki | |
| 5,576,079 A | 11/1996 | Forman et al. | |
| 5,783,279 A | 7/1998 | Edgson et al. | |
| 6,129,122 A | 10/2000 | Bilisik | |
| 6,248,417 B1 | 6/2001 | Ponsolle et al. | |
| 6,258,737 B1 * | 7/2001 | Steibel et al. | 442/172 |
| 6,365,257 B1 | 4/2002 | Hecht | |
| 6,446,675 B1 | 9/2002 | Goering | |
| 2002/0153084 A1 | 10/2002 | Johnson et al. | |
| 2003/0196743 A1* | 10/2003 | Borbone et al. | 156/180 |
| 2004/0221941 A1* | 11/2004 | Bouillon et al. | 156/155 |

FOREIGN PATENT DOCUMENTS

| | | |
|---|---|---|
| EP | 1 246 957 A1 | 10/2002 |
| WO | WO 98/39507 | 9/1998 |

* cited by examiner

*Primary Examiner*—Melvin Mayes
(74) *Attorney, Agent, or Firm*—McNees Wallace & Nurick LLC (57) ABSTRACT

An orthogonal stitch-weave method and fiber architecture. The architecture allows near-net-shape composite preforms to be fabricated, thereby reducing costs associated with complex preform shapes and increasing desired strengths of the composite.

14 Claims, 7 Drawing Sheets

ORTHOGONAL WEAVING FOR COMPLEX SHAPE PREFORMS

STATEMENT REGARDING FEDERALLY SPONSORED RESEARCH OR DEVELOPMENT

This invention was made with government support under Contract No. F33615-C-2893. The government may have certain rights to the invention.

FIELD OF THE INVENTION

The present invention relates generally to composite preforms and methods for making composite preforms.

BACKGROUND OF THE INVENTION

In a gas turbine engine, air is pressurized in a compressor and mixed with fuel in a combustor and ignited for generating hot combustion gasses which flow downstream through several turbine stages. A turbine stage includes stationary turbine vanes extending radially between inner and outer castings. The vanes are hollow with openings that mate to openings within the castings. The vanes have airfoil configurations for guiding the combustion gasses between corresponding turbine rotor blades disposed downstream of the vanes. The blades are mounted to the perimeter of a rotor disk that rotates during operation for providing power to turn the compressor or fan during operation. Since the turbine vanes are heated during operation by the hot combustion gasses which flow thereover, cooling air bled from the compressor is channeled inside the vanes for cooling thereof.

In order to increase the efficiency and the performance of gas turbine engines so as to provide increased thrust-to-weight ratios, lower emissions and improved specific fuel consumption, engine turbines are tasked to operate at higher temperatures. As the higher temperatures reach and surpass the limits of the material comprising the components in the hot section of the engine and in particular the turbine section of the engine, new materials must be developed.

As the engine operating temperatures have increased, new methods of cooling the high temperature alloys comprising the combustors and the turbine airfoils have been developed. For example, ceramic thermal barrier coatings (TBCs) have been applied to the surfaces of components in the stream of the hot effluent gases of combustion to reduce the heat transfer rate and to provide thermal protection to the underlying metal and allow the component to withstand higher temperatures. These improvements helped to reduce the peak temperatures and thermal gradients. Simultaneously, ceramic matrix composites were developed as substitutes for the high temperature alloys. The ceramic matrix composites (CMCs) in many cases provided an improved temperature and density advantage over the metals, making them the material of choice when higher operating temperatures were desired.

A number of techniques have been used to manufacture turbine engine components. One such technique includes manufacturing turbine blades from CMCs. One method of manufacturing CMC components, set forth in U.S. Pat. Nos. 5,015,540; 5,330,854; and 5,336,350; incorporated herein by reference in their entirety and assigned to the assignee of the present invention, relates to the production of silicon carbide matrix composites containing fibrous material that is infiltrated with molten silicon, herein referred to as the Silcomp process. The fibers generally have diameters of about 140 micrometers or greater, which prevent intricate, complex shapes, such as turbine blade components, from being manufactured by the Silcomp process.

Another technique of manufacturing CMC turbine blades is the method known as the slurry cast melt infiltration (MI) process. A technical description of such a slurry cast MI method is described in detail in U.S. Pat. No. 6,280,550 B1, which is assigned to the Assignee of the present invention and which is incorporated herein by reference. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The use of two dimensional plies prevents intricate, complex shapes, such as turbine blade components, from being manufactured.

One disadvantage of existing methods for production of CMC preforms is that the fibers that provide advantageous structural properties to a composite are not positioned and interlocked or interwoven to provide an optimal fiber architecture. Conventional methods of three-dimensional composite performing typically involve fabricating woven, or braided shapes that do not provide the desired complex preform shapes. What is needed is a method of weaving a three-dimensional composite preform that provides a tailored fiber architecture which may be assembled "near-net-shape".

SUMMARY OF THE INVENTION

Improvements in manufacturing technology and materials are the keys to increased performance and reduced costs for many articles. As an example, continuing and often interrelated improvements in processes and materials have resulted in major increases in the performance of aircraft gas turbine engines, such as the improvements of the present invention. The present invention is a novel method for manufacturing a turbine engine component made from a ceramic matrix composite (CMC) by weaving a three-dimensional composite preform that provides a tailored fiber architecture that may be assembled near-net-shape. A near-net-shape is a shape for a composite preform that, after weaving, requires little or no trimming prior to final fabrication of the composite. The present invention produces a component tailored to an intricate, complex shape having the advantage of a fine unit cell size inside the weave, wherein the resultant composite has superior mechanical properties and erosion resistance.

The method of the present invention is particularly suitable for fabrication of turbine airfoil components for gas turbine engines. In particular, the method of the present invention is suitable for the fabrication of stationary turbine vanes for use in gas turbine engines. The method of the present invention is particularly suitable for composites having complex and/or intricate shapes, such as stationary turbine vanes, because the method allows fabrication of preforms of a complex and/or intricate shape that does not require trimming (i.e., near-net-shape) prior to final fabrication into the composite.

The present invention provides a method of weaving a preform that includes positioning a predetermined number of warp pins on a base. The warp pins on the base are positioned to form a path substantially forming the outline of a desired preform shape. A predetermined number of dummy pins are positioned on the base, outlining the path formed by the warp pins. The dummy pin's help facilitate placement of the weft tow and stitcher tow by providing support for the tows along the path formed by the warp pins. The method further includes positioning a first predetermined number of weft tows adjacent the warp pins to form a general outline of the desired preform shape. A predetermined number of stitcher tows are positioned adjacent the warp and dummy pins. A predetermined number of stitcher tows are positioned adjacent and substantially perpendicular to the first predetermined number of weft tows. The warp pins and the dummy pins are advanced through the base to maintain a length of pin sufficient to place the weft and stitcher tows. A second predetermined number of weft tows are positioned adjacent the warp pins in the path formed by the warp pins, in a direction opposite the direction of the first predetermined number of weft tows. The second predetermined number of weft tows are laid upon the previously placed weft tows and stitcher tows. A second predetermined number of stitcher tows are positioned adjacent and substantially perpendicular to the second predetermined number of weft tows. The method is repeated in order to build a thickness of weft tows and stitcher tows. The plurality of weft tows and stitcher tows placed adjacent the warp pins and dummy pins form the general outline of the desired preform shape having a build dimension perpendicular to the weft tows and stitcher tows. When a predetermined thickness for the build dimension is reached, the warp and dummy pins are removed and the warp pins are replaced by warp tows. The resultant preform is near-net-shape having an interlocked and interwoven fiber architecture.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
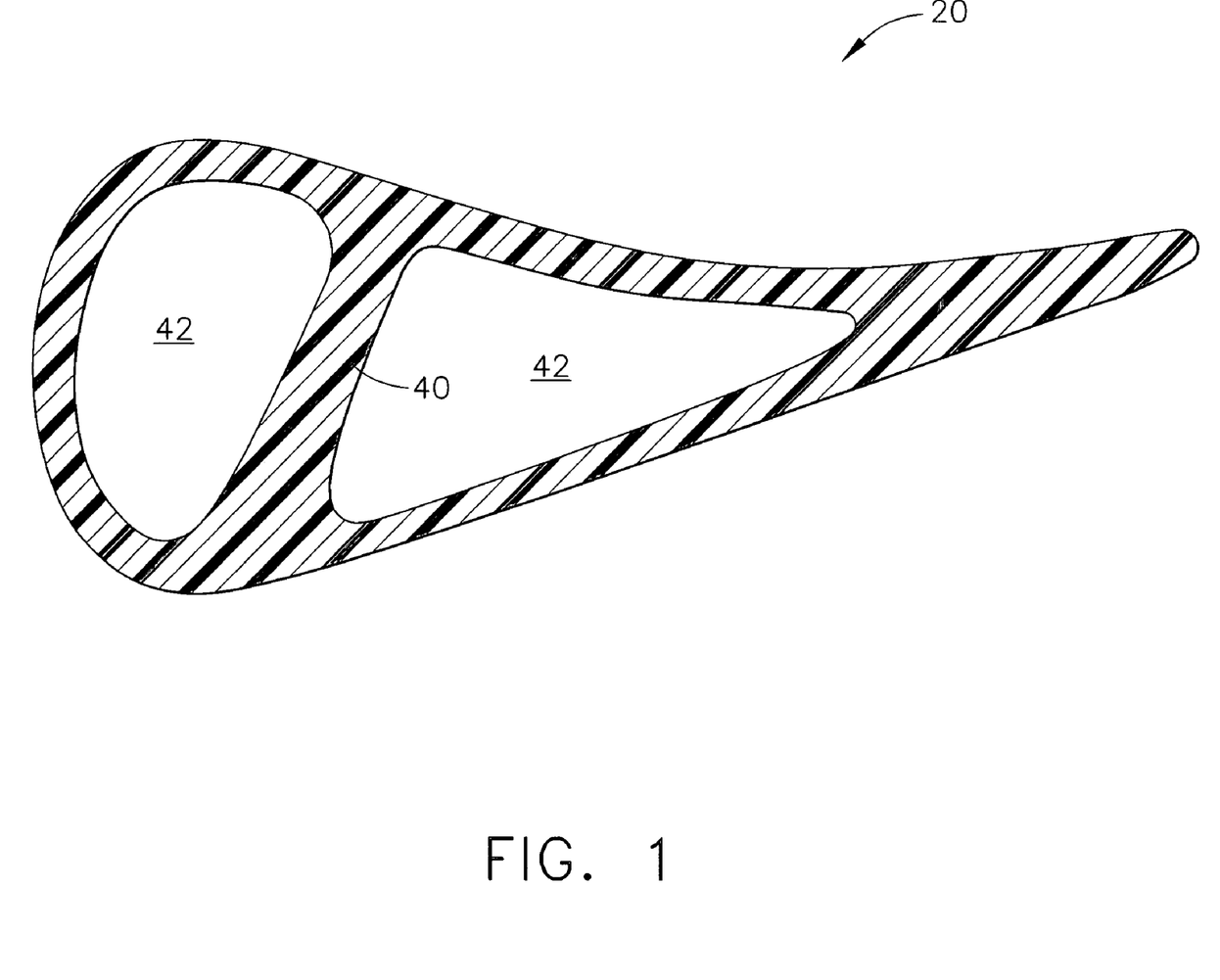
FIG. 1 is a sectional view of a hollow turbine for a gas turbine engine vane, illustrating the geometry of the vane along a radial axis of the engine.

FIG. 1 illustrates a sectional view of vane 20. Vane 20 is a relatively complex three dimensional shape that includes a structural stiffener 40 and cooling air channels 42. During engine operation, cool, compressed air is bled from a compressor section of a gas turbine engine (not shown) and directed through channels 42 to cool vane 20.

Figure 2:
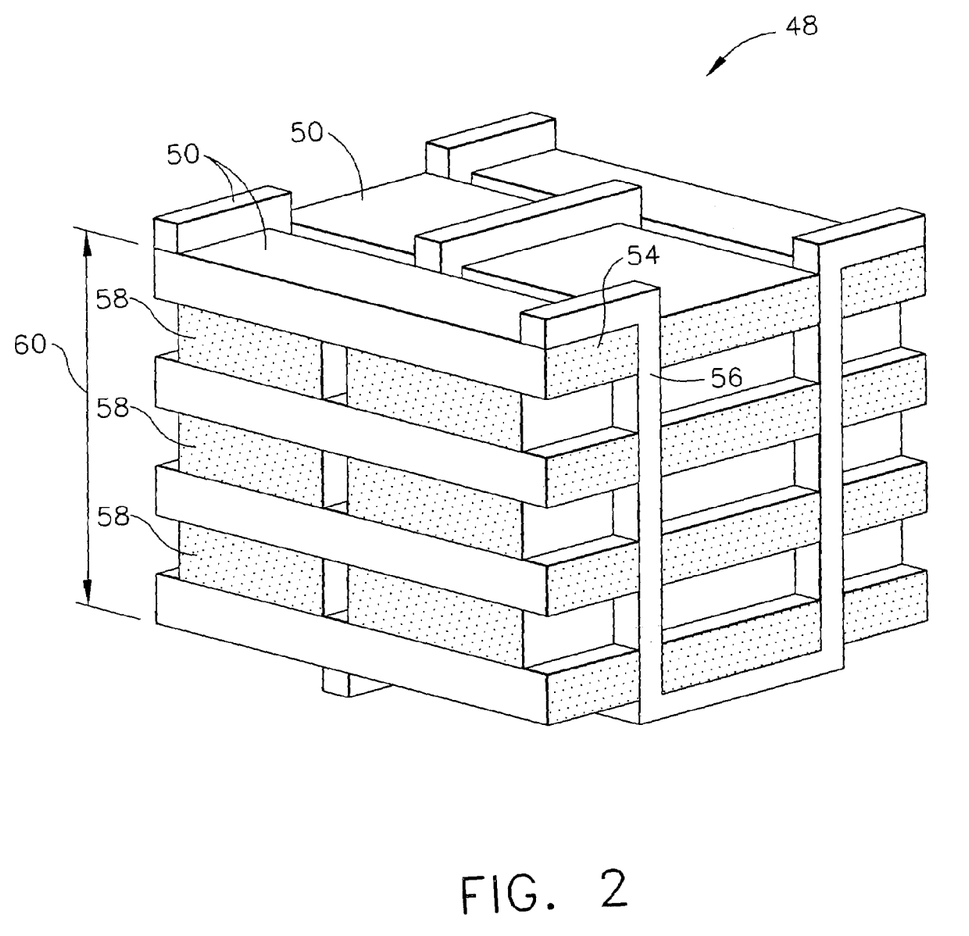
FIG. 2 is a perspective view of the orthogonal stitch-weave pattern of the present invention.

FIG. 2 is a perspective representation of the stitch-weave 48 of the present invention illustrating a plurality of fiber tows 50 arranged in a preferred architecture. As will be appreciated, FIG. 2 depicts the pattern created by the present invention. Fiber tows 50 are made up of one or a plurality of long, relatively thin smaller fibers. As shown in FIG. 2, fiber tows 50 include three types including: weft tows 54, a stitcher tows 56 and warp tows 58. The smaller fibers making up the fiber tows 50 are any fiber suitable for the construction of preforms for ceramic matrix composites. The fibers may include, but are not limited to silicon carbide (SiC). Weft tows 54 and warp tows 58 and stitcher tows 56 are in a three dimensional orthogonal geometry. In one embodiment of the invention, the weft tows 54, the warp tows 58 and the stitcher tows 56 are oriented at 90° angles to each other. The length of the weft tows 54 and the warp tows 58 define a first and second orthogonal directions, respectively. The stitch-weave 48 is defined by a through-thickness 60 as measured along a third orthogonal direction.

Figure 3:
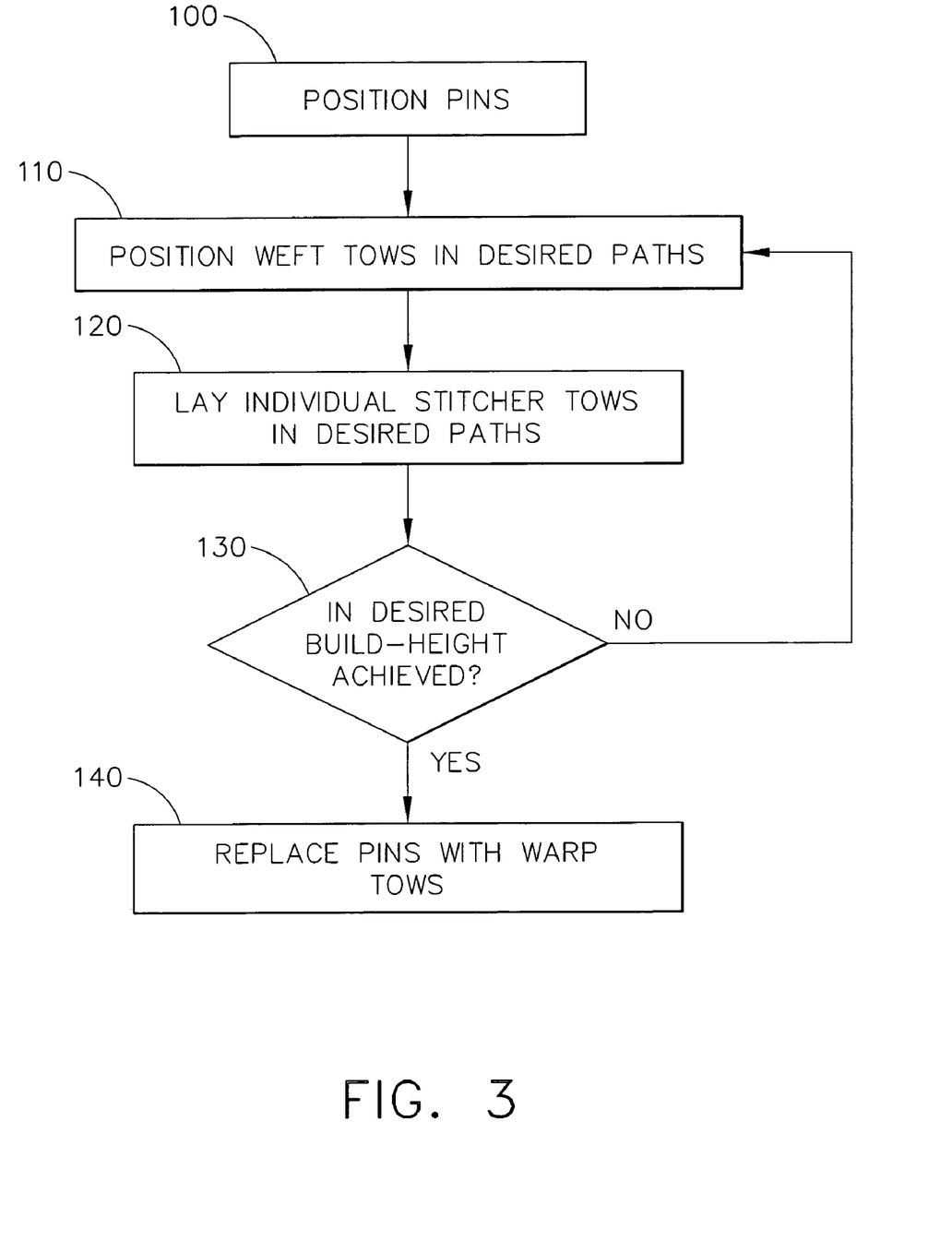
FIG. 3 is a flow chart illustrating an exemplary method in accordance with the present invention.

FIG. 3 illustrates a preferred method in accordance with the present invention, illustrating discreet method steps. In Step 100, warp pins 72 and dummy pins 74 are placed along a base to define a desired preform shape. FIGS. 4 through 9 illustrate the positioning of the weft tows 54, and stitcher tows 56 as illustrated as steps 110 and 120 in FIG. 3. In Step 110, weft tows 54 are positioned, or laid, in a path adjacent to warp pins 72, thereby outlining the desired shape (see FIG. 4). In Step 120, stitcher tows 56 are positioned, or laid, adjacent to warp pins 72 and dummy pins 74 at an angle substantially perpendicular to the positioned weft tows 54 (see FIG. 5). In Step 130, a determination is made as to whether the desired build height, as measured along the axis perpendicular to both the weft tows and the stitcher tows 56, has been achieved. If the build height determination of Step 130 is negative, the process returns to step 110 and the steps are repeated with the positioning of the weft tows 54 and the laying of the stitcher tows 56. If the build height determination of Step 130 is positive, the process proceeds to step 140. In Step 140, the warp pins 72 and dummy pins 74 are removed and warp pins 72 are replaced by warp tows 58, thereby completing the fabrication of stitch-weave 48.

Figure 8:
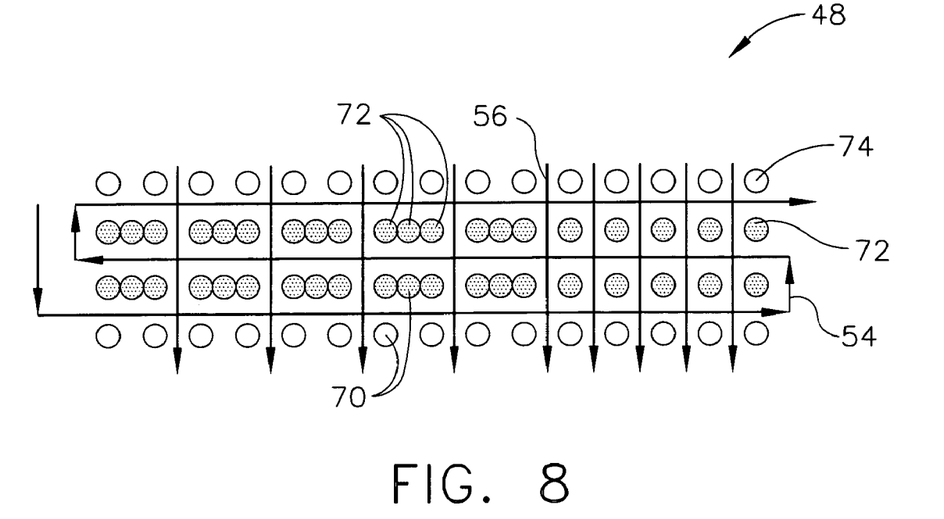
FIG. 8 is a variation of the stitch-weave method shown in FIGS. 4 through 7.
Figure 9:
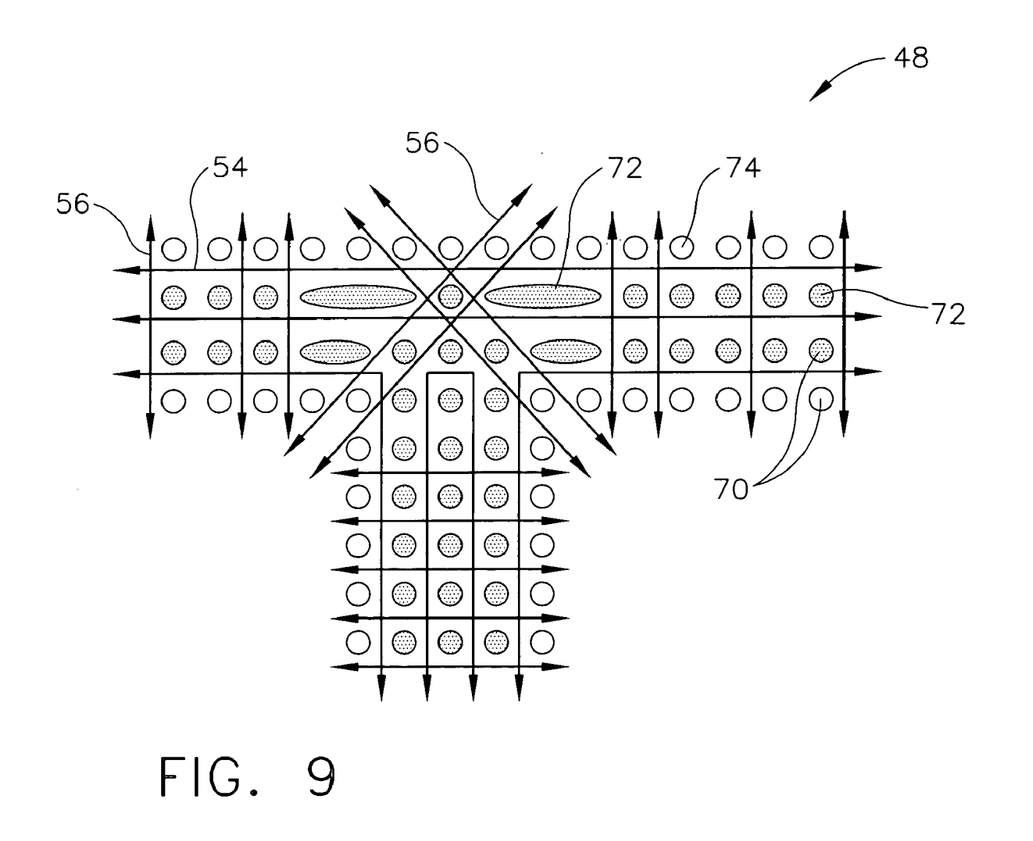
FIG. 9 is a variation of the stitch-weave shown in FIG. 8, illustrating an exemplary pattern used to create joints in complex shapes, in accordance with the present invention.

FIGS. 4 through 7 illustrate the positioning of the weft tows 54 and the stitcher tows 56 as the build height is created. FIGS. 8 and 9 illustrate alternate embodiment for the placement of the pins and the positioning of the weft tows 54 and stitcher tows 56. The pins shown in FIGS. 4 through 9 comprise warp pins 72 and dummy pins 74. Warp pins 72 are replaced by warp tows 58 when the predetermined build height is achieved. Dummy pins 74 facilitate weft tow 54 and stitcher tow 56 placement and are not replaced by the warp tows 58.

Figure 4:
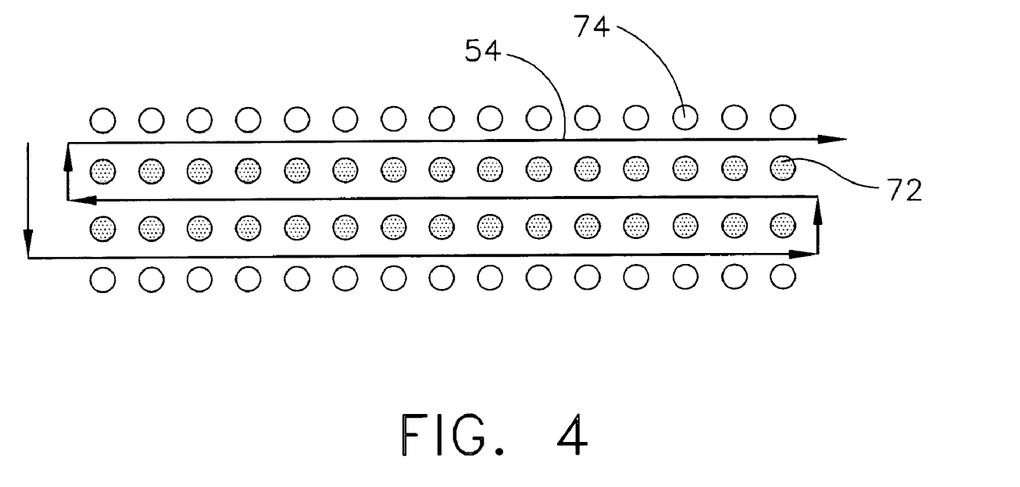
FIG. 4 is a sectional view illustrating an initial step of creating the stitch-weave of FIG. 2.

FIG. 4 illustrates the "Position Weft Tows in Desired Paths" Step 110 of FIG. 3, wherein warp pins 72 and dummy pins 74 are positioned and a weft tow 54 is positioned, or laid, adjacent to the warp pins 72 and dummy pins 74 in a desired path.

Figure 5:
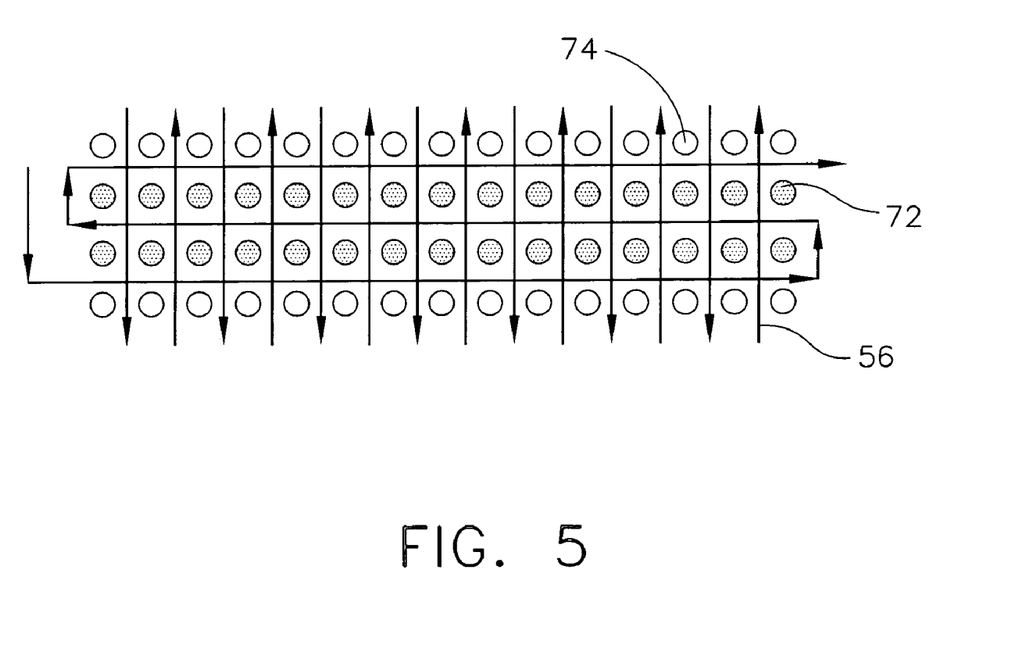
FIG. 5 is a sectional view illustrating the arrangement of FIG. 4, with a further step of creating the stitch-weave of FIG. 2.

FIG. 5 illustrates the "Lay Individual Stitcher Tows in Desired Paths" Step 120 of FIG. 3, wherein the stitcher tows 56 are positioned, or laid, at an angle perpendicular to the weft tows 54 and warp pins 72 and dummy pins 74.

Figure 6:
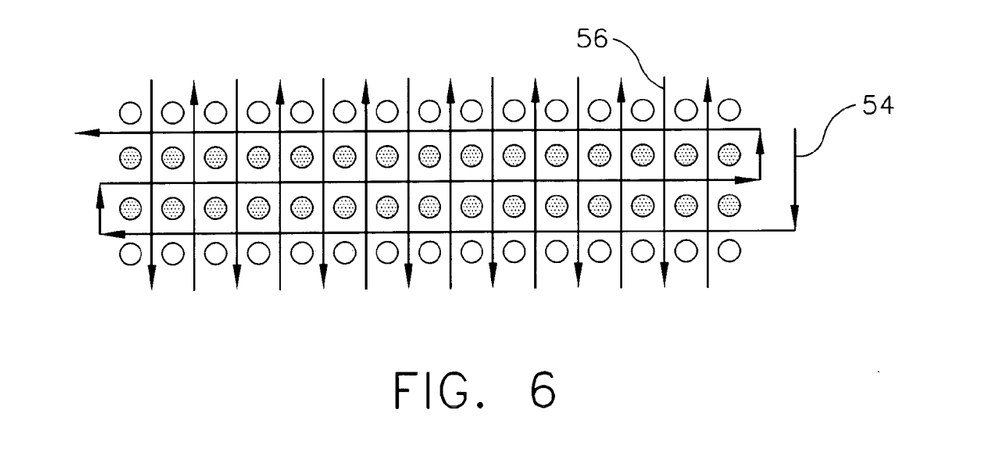
FIG. 6 is a sectional view illustrating the arrangement of FIG. 5, with a further step of creating the stitch-weave of FIG. 2.

FIG. 6 illustrates the continuation of Step 110, immediately after Step 130, wherein additional weft tows 54 are positioned, or laid, adjacent to the warp pins 72 in the desired path. The weft tows 54 and stitcher tows 56 build on top of each other and form a build height in a third dimension perpendicular to both the weft tows 54 and stitcher tows 56.

Figure 7:
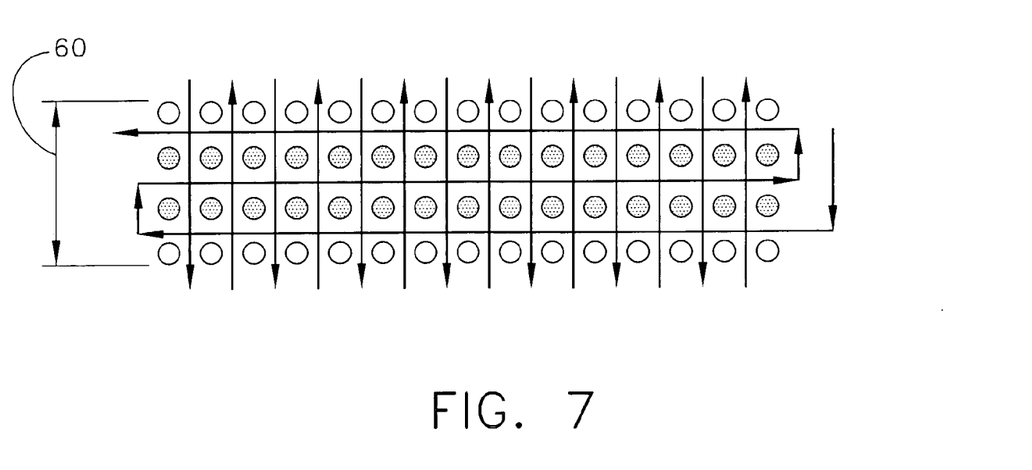
FIG. 7 is a sectional view illustrating the arrangement of FIG. 6, with a further step of creating the stitch-weave of FIG. 2.

FIG. 7 illustrates a continuation of Step 120, after a performance of a previous Step 120, wherein the stitcher tows 56 are positioned, or laid, adjacent to warp pins 72 and dummy pins 74 in about a 180° orientation (i.e. the opposite direction) from the previous Step 120. The orientations for the repeated step 120 are rotated 180° for each iteration of the method shown in FIG. 3. In this manner, the resultant stitch-weave 48 illustrated in FIG. 7 is built up in the direction perpendicular to the weft tows 54 and stitcher tows 56 and is fabricated for a three dimensional shape. In order to complete the weave-stitch process of the present invention, once the predetermined build-height is achieved, the dummy pins 74 and warp pins 72 are removed and warp pins 72 are replaced with warp tows 58. The replacement of the warp pins 72 with the warp tows 58 reinforces of the stitch-weave. 48 in the direction perpendicular to both the weft tows 54 and the stitcher tows 56.

FIG. 8 illustrates a variation of the stitch-weave 48 of FIGS. 4–7, wherein the dummy pins 74 and warp pins 72 are positioned in an alternate shape. Specifically, a plurality of pins 70 are positioned adjacent to one another in a portion of the preform shape. The stitch-weave 48 illustrated in FIG. 8 is performed in the same manner as described in FIG. 3 to fabricate a stitch-weave 48. In this manner, stitch weave 48 will have a greater number of warp tows 58, thereby increasing the strength of the resulting composite along the axis of the warp tows 58. The strength of a composite preform is tailored by the ratio of warp tows 58 to stitcher tows 56, and by other desired tow ratios.

FIG. 9 illustrates a stitch weave 48 wherein a joint is created in accordance with the method of FIG. 4. As described herein, weft tows 54 are laid, stitcher tows 56 are laid, an additional weft tows 54 is laid, and then the same stitcher tows 56 are laid adjacent pins 70, thereby permitting stitcher tows 56 to stitch together the resulting preform, providing a desired shape.

Figure 10:
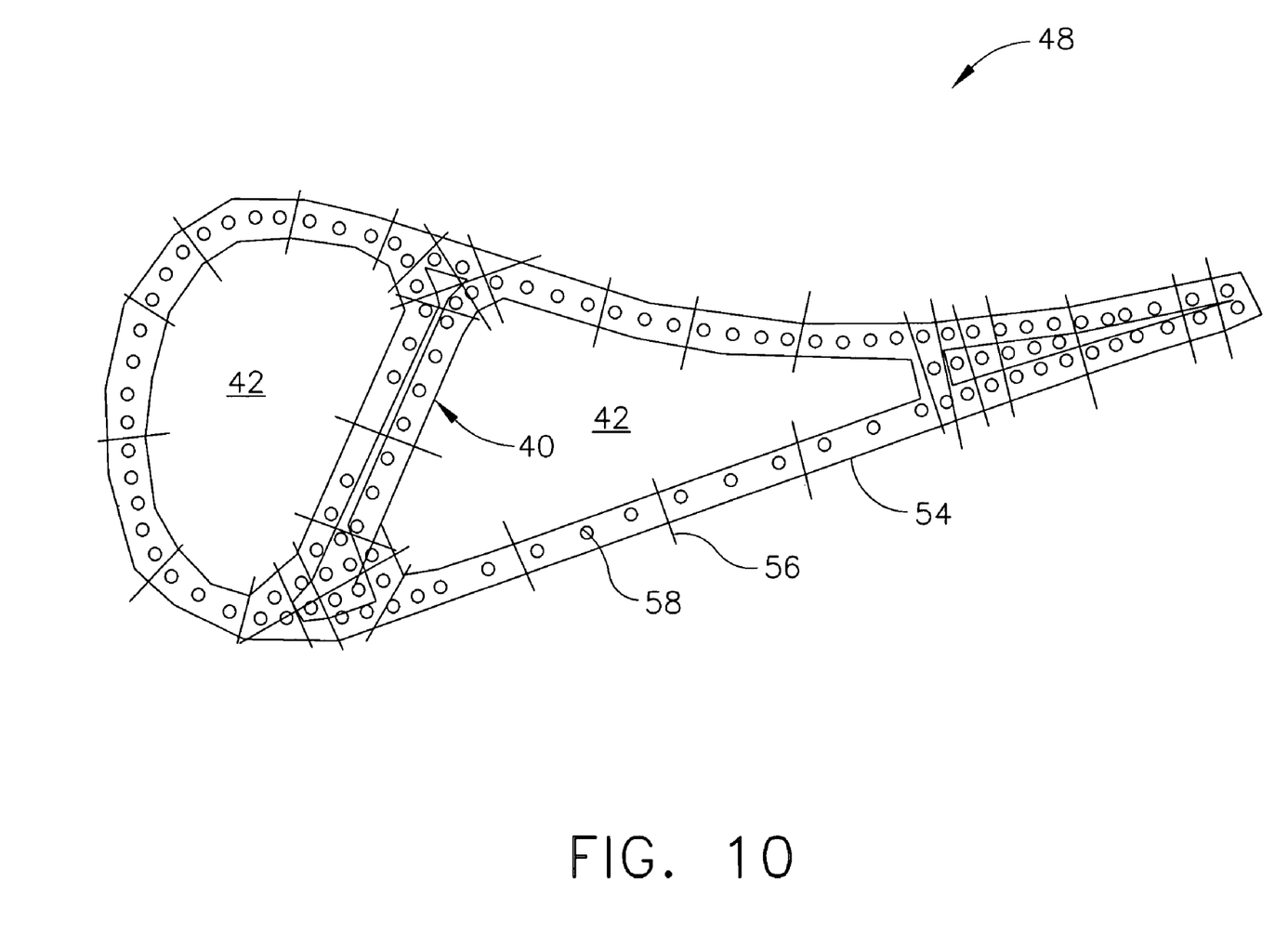
FIG. 10 is a sectional view of the hollow vane of FIG. 1, illustrating the stitch-weave pattern of FIG. 2, in accordance with the present invention.

FIG. 10 illustrates the fabrication of a preform architecture of the vane of FIG. 2 in accordance with the method of FIG. 3. In FIG. 10, dummy pins 74 are omitted for clarity, and warp pins 72 have been replaced with warp tows 58. As will be appreciated, many differing complex shapes can be fabricated by the teachings of the present invention. It should be noted that the positioning of weft tows 54 may include multiple weft tows 54 at differing locations within stitch-weave 48 in a single step. Thus provided, vane 20 can be constructed of a ceramic matrix composite wherein the preform is initially stitched and woven into an optimized architecture that may be tailored to provide desired properties.

In another embodiment of the invention, the positioning of the stitcher tows 56 includes a step wherein the stitcher tows 56 are positioned, or laid, adjacent to warp pins 72 and dummy pins 74 at an angle substantially perpendicular to the positioned weft tows 54, at locations along the desired preform shape in order to provide the finished ceramic matrix composite with additional transverse fiber reinforcement.

In another embodiment of the invention, after the preform of near-net-shape has been woven, the preform may be processed according to any known ceramic matrix composite processing method known for ceramic cloths, including woven ceramic cloths. Examples of suitable processes for forming the final ceramic matrix composite include, but are not limited to chemical vapor infiltration, wherein a preform of woven ceramic preform is set inside a chemical vapor reactor, the preform is heated, and atoms or molecules in the form of vapor are deposited on and, preferably, within the woven ceramic preform; lanxide process, the ceramic preform is dipped into a liquid metal bath and the metal is converted to a ceramic material via oxidation; melt infiltration, wherein the woven preform is infiltrated with a carbon containing slurry, which is converted to ceramic through infiltration with molten silicon; and polymer impregnation and pyrolysis, wherein the perform is impregnated with a polymeric precursor of the matrix which is converted to ceramic through pyrolysis of the polymer at elevated temperature. Each of these process methods generally includes the step of coating the preform with a thin layer of ceramic interface (BN, $BN/Si_3N_4$) prior to matrix processing. While the present invention has been described with respect to CMC processing, the weaving method of the present invention may also be used in preparation of any composite preform, including but not limited to, carbon-epoxy composites and carbon-carbon composites.

In a preferred embodiment of the invention, after the preform of near-net-shape has been woven, the preform may be processed into a CMC by slurry cast melt infiltration. Slurry cast melt infiltration includes slurry casting a matrix, such as SiC, into the porous preform. The slurry cast preform is then subject to densification through melt infiltration with a suitable infiltrate, such as silicon.

The fibers useful as tows in the present invention include, but are not limited to SiC. Alternate suitable fibers include carbon fibers; oxide fibers, such as alumina (i.e. $\alpha$-$Al_2O_3$) and alumina-silica fibers; coated fibers, such as boron nitride and carbon coated fibers; and combinations thereof.

A suitable matrix for the processed preform of near-net shape CMC includes, but is not limited to silicon carbide. Alternate matrices include alumina, silica, alumina-silicate, glass, mullite, carbon, oxides of such elements as Al, Si, Hf, Y and Zr, and their mixtures and combinations thereof.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of weaving a preform for forming a finished ceramic matrix composite comprising:

positioning a predetermined number of pins in a base, wherein the pins extend perpendicularly from the surface of the base and wherein the pins are positioned laterally across the base to form a general outline of a desired preform shape;

positioning a first predetermined number of weft tows adjacent the pins in a first path forming a general outline of the desired preform shape;

positioning a predetermined number of stitcher tows adjacent to the pins, wherein the stitcher tows are positioned adjacent to the first predetermined number of weft tows and perpendicular to the path forming the general outline of the desired preform shape; and advancing the pins perpendicularly through the base to provide sufficient pin length to allow positioning of additional weft tows and stitcher tows;

wherein the positioning of the weft tows, the positioning of the stitcher tows and the advancing of the pins are repeated until the weft tows and the stitcher tows form a predetermined thickness;

wherein upon achieving said predetermined thickness, the pins are removed and replaced with a warp tow to form the desired preform shape.

2. The method of claim 1, wherein the desired preform shape is a shape requiring substantially no trimming prior to final fabrication into the finished ceramic matrix composite.

3. The method of claim 1, further comprising the step of determining a predetermined ratio of stitcher tows to warp tows to control the strength of the finished ceramic matrix composite.

4. The method of claim 3, wherein the predetermined ratio includes a greater number of warp tows than stitcher tows to increase the strength of the ceramic matrix composite in a direction parallel to the warp tows.

5. The method of claim 1, wherein the step of positioning a predetermined number of stitcher tows includes positioning the stitcher tows at locations along the desired preform shape in order to provide the finished ceramic matrix composite with transverse fiber reinforcement.

6. The method of claim 1, wherein the weft tows, the stitcher tows and the warp tows include a plurality of individual fibers.

7. The method of claim 6, wherein said fibers are silicon carbide.

8. The method of claim 1, further comprising infiltrating the desired preform shape to form a ceramic matrix composite.

9. The method of claim 8, wherein the infiltrating includes casting the preform with a slurry matrix to form a slurry cast preform and thereafter subjecting the slurry cast preform to melt infiltration to form the finished ceramic matrix composite.

10. The method of claim 8, wherein the ceramic matrix composite is an airfoil component for a gas turbine engine.

11. A method of making a ceramic matrix composite comprising:

weaving fiber tows into a ceramic matrix composite preform, wherein weaving fiber tows includes, positioning a predetermined number of pins in a base, wherein the pins extend perpendicularly from the surface of the base and wherein the pins are positioned laterally across the base to form a general outline of a desired preform shape;

positioning a first predetermined number of weft tows adjacent the pins in a first path forming a general outline of the desired preform shape;

positioning a predetermined number of stitcher tows adjacent to the pins, wherein the stitcher tows are positioned adjacent to the first predetermined number of weft tows and perpendicular to the path forming the general outline of the desired preform shape; and advancing the pins perpendicularly through the base to provide sufficient pin length to allow positioning of additional weft tows and stitcher tows;

wherein the positioning of the weft tows, the positioning of the stitcher tows and the advancing of the pins are repeated until the weft tows and the stitcher tows form a predetermined thickness;

wherein upon achieving said predetermined thickness, the pins are removed and replaced with a warp tow to form the desired preform shape, and thereafter, processing the ceramic matrix composite preform into a ceramic matrix composite wherein the processing forms a finished ceramic matrix composite substantially without trimming of the preform.

12. The method of claim 11, wherein the preform is in the shape of an airfoil component for a gas turbine engine.

13. The method of claim 11, wherein the processing includes no trimming of the preform.

14. The method of claim 11, wherein the processing includes casting the preform with a slurry matrix to form a slurry cast preform and thereafter subjecting the slurry cast preform to melt infiltration to form the finished ceramic matrix composite.

* * * * *